March 26, 1963     P. L. STURLA     3,082,684
HAY BALER
Filed June 5, 1962
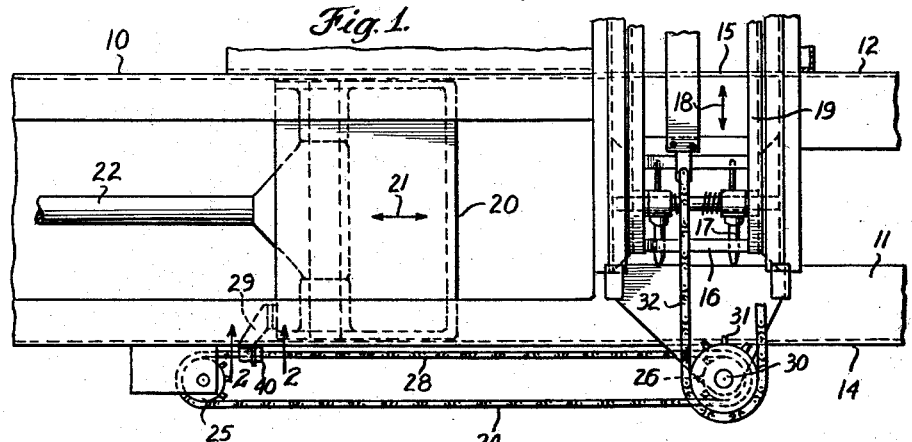
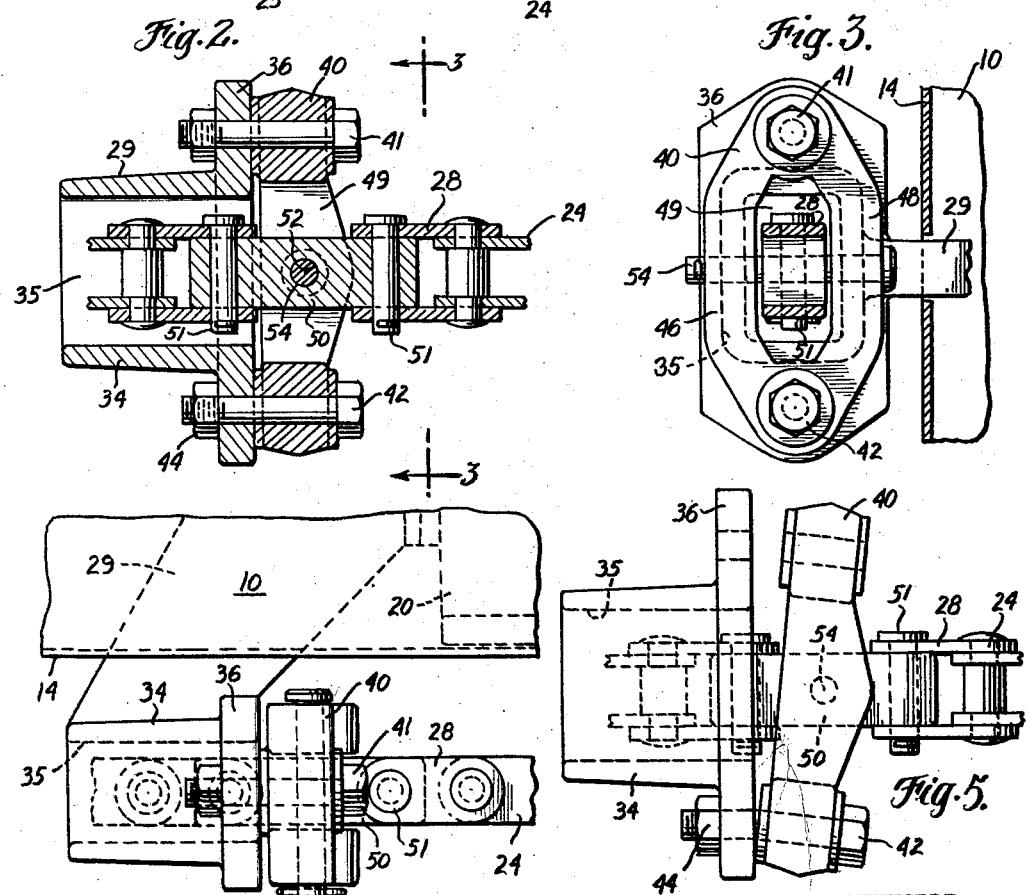
INVENTOR.
PETER L. STURLA
BY Joseph A. Brown
ATTORNEY

United States Patent Office 3,082,684
Patented Mar. 26, 1963

3,082,684
HAY BALER
Peter L. Sturla, Churchtown, Pa., assignor to Sperry Rand Corporation, New Holland, Pa., a corporation of Delaware
Filed June 5, 1962, Ser. No. 200,240
4 Claims. (Cl. 100—142)

This invention relates to automatic hay balers and more particularly to improved means for driving a feeder mechanism from a reciprocating plunger in a baler. Still more specifically, the invention relates to an improved frangible connection between a baler plunger and a feeder drive chain whereby the drive to the feeder will be stopped if an overload situation results.

In some hay balers of prior design, it is the practice to drive the baler feeder mechanism directly from the reciprocating bale forming plunger of the baler. An endless chain is provided which is mounted on and extends along the bale case. There is a connection provided between the baler plunger and the drive chain whereby when the plunger is reciprocated the chain is oscillated. A suitable drive connection is provided from the drive chain to the feeder mechanism so that the feeder is operated from the chain in precise timed relation with the baler plunger. As is conventional, the drive connection between the plunger and the drive chain to the feeder is solid in one direction and adapted to break in the opposite direction. In the connection, shear bolt means is provided so that if the feeder becomes overloaded or encounters an immovable object on a feeding stroke, the drive from the plunger to the feeder will be broken and the feed operation will cease. On the next return stroke, the feeder mechanism will be moved away from the bale case so that the mechanism will not be damaged on the next working stroke of the plunger.

It has been found desirable to provide two shear bolts on opposite sides respectively of the drive chain and connected to an arm extending transversely from the baler plunger. The drive chain is fixedly connected to a connector block and the block is in turn fastened by the shear bolts to the support arm of the plunger. It sometimes happens, that when the feeder becomes overloaded one of the shear bolts breaks before the other. When this occurs, the connector block swings about the bolt which has not broken. Since the chain is fixed relative to the block, it is sometimes subjected to substantial bending strains. In most instances, both shear bolts break at the same time, or the second bolt breaks at a point so close to the time that the first bolt breaks, that the chain is protected from bending forces. However, in the circumstance where only one bolt breaks and the other remains unbroken beyond a certain interval, undesirable strain and bending forces are applied to the chain.

One object of this invention is to provide, in a hay baler of the character described, an improved detachable connection between a feeder drive chain and a reciprocating plunger.

Another object of this invention is to provide an improved drive connection between a plunger and a feeder drive chain wherein two shear bolts are employed, pivot means being provided in the connection between the chain and the plunger whereby if one or the other of the bolts breaks while one remains intact, the connecting means is free to pivot relative to the chain thereby protecting the chain from bending strains.

Another object of this invention is to provide a shear bolt drive connection of the character described whereby a feeder drive chain is permitted to remain in proper operating position at all times regardless of whether the connection to the baler plunger is broken or unbroken.

A further object of this invention is to provide a plunger and drive chain connection of the character described which is simply designed and inexpensive to manufacture, assemble, and repair.

Other objects of this invention will be apparent hereinafter from the specification and from the recital in the appended claims.

In the drawing:

FIG. 1 is a fragmentary plan view of the bale case portion of a baler showing a plunger in retracted position and a feeder in extended position and a drive between the plunger and the feeder;

FIG. 2 is an enlarged longitudinal vertical section taken on the line 2—2 of FIG. 1 looking in the direction of the arrows and showing the connection between the plunger and the feeder drive chain constructed according to this invention;

FIG. 3 is an end view taken on the line 3—3 of FIG. 2 looking in the direction of the arrows;

FIG. 4 is a plan view of FIG. 2 and showing also a portion of the bale case and baler plunger; and FIG. 5 is a side elevational view showing the operation of the connection means of this invention.

Referring now to the drawing by numerals of references, and first to FIG. 1, 10 denotes generally a hay baler bale case which is rectangular in cross section and elongated. The bale case has a top wall 11 and vertical side walls 12 and 14. Wall 12 is provided with an infeed opening 15 through which crop material may be fed into the bale case 10. The infeed of material is achieved by a feeder mechanism 16 which is reciprocable in the direction of the arrows 18 on a horizontal track structure 19. In general, the feeder mechanism may be constructed as shown in U.S. application Ser. No. 36,561. As shown in FIG. 1, track structure 19 extends over the top 11 of bale case 10, the feeder having depending fingers 17 adapted to move in and out of the bale case through feed opening 15. In FIG. 1, the feeder is shown at the end of a feeding stroke, after which it will withdraw from the bale case to secure another charge of material to be fed into the bale case.

For compressing crop material delivered through side opening 15, a bale forming plunger 20 is provided which reciprocates in the direction indicated by the arrows 21. In FIG. 1 plunger 20 is shown in a retracted position, being adapted to move toward the right and past the opening 15 on a working stroke to compress the crop material. The reciprocation of the plunger is in a direction parallel to the elongation of bale case 10. The plunger is driven by a connecting rod 22 reciprocated by a conventional crank arm mechanism, not shown. Since the feeder 16 and plunger 20 travel across intersecting paths, they must operate in precise timed relation. For this purpose, an endless drive chain 24 is provided which extends parallel to the direction of reciprocation of plunger 20. Chain 24 is supported on a pair of sprockets 25 and 26 rotatable about vertical axes. The inner reach 28 of the chain is connected to plunger 20 through a transversely extending support arm 29 having one end affixed to the plunger and its opposite end connected to the drive chain. As the plunger is reciprocated, chain 24 is oscillated and such oscillation is transmitted to the sprocket 26 which operates to drive a vertically extending shaft 30 having a sprocket 31 at its upper end. Extending around sprocket 31 is a chain 32 connected to the feeder mechanism 16 to impart a driving force thereto to move it in and out of the bale case 10. This overall arrangement is similar to that shown in U.S. application 36,561, the subject of this invention residing in the connection between the support arm 29 and the reach 28 of drive chain 24.

At its inner end, the support arm 29 has a tubular collar 34 (FIGS. 2 and 4) providing an opening 35 through which the reach 28 of the chain 24 freely extends. One axial end of collar 34 has radially outwardly extending flange portions 36 above and below the chain reach 28. A connector block 40 is fastened to flange portions 36 by a pair of shear bolts 41 and 42 located, respectively, above and below the chain reach 28 and fastened to the flange portions 36 by nuts 44. The bolts extend parallel to the direction of reciprocation of plunger 20 and to the extension of chain reach 28. As shown in FIG. 3, connector block 40 is generally O-shaped, having vertically extending side legs 46 and 48 on opposite lateral sides of the chain reach 28. A central opening 49 is provided in the connector block through which the drive chain extends.

The reach 28 of the drive chain 24 has a solid, rectangularly shaped link element 50 connected by pins 51 to adjacent links of the drive chain. The link element 50 is located and extends through connector block 40, having a bore 52 the axis of which is transverse to the extension of chain reach 28 and to the extension of shear bolts 41 and 42. Located in bore 52 is a pivot pin 54, the ends of which extend through the legs 46 and 48 of connector block 40. The pin 54 provides a connection whereby the connector block 40 may pivot relative to the drive chain reach 28.

In operation, if the feeder 16 becomes overloaded on a feeding stroke, that is when the feeder is moving toward bale case 10, the bolts 41 and 42 will most likely shear at the same time to break the drive from plunger 20 to the feeder. However, if one bolt only breaks, as shown in FIG. 5 where bolt 41 is detached, the connector block will pivot about bolt 42 and about connector pin 54. The drive chain reach 28 is thus protected against bending strains and loads.

Momentarily after the first bolt breaks, the second bolt will break and then the drive from plunger 20 to feeder mechanism 16 will cease. As will be seen from FIGS. 2 and 5, when the connection to the support arm 29 is broken by the shear bolts 41 and 42 separating, the reach 28 is free to move toward the right. However, a positive connection is provided by the engagement of the flange portion 36 of arm 29 with connector block 40 so that the chain is not free for travel in the opposite direction. Thus, if the break occurs when the feeder is located projecting into the bale case 10, the flange portion on support arm 29 will engage the connector block 40 and impart drive through the chain 24 to the feeder to remove it from the bale case. However, on the next working stroke, the support arm 29 will travel free relative to the drive chain and the feeder mechanism 16 will not be moved toward the bale case.

The structure employed is simple and relatively inexpensive. Nevertheless, the drive chain from the plunger to the feeder mechanism is protected against damage and undue strain when a breaking action occurs.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a hay baler, a bale case, a plunger reciprocable in said bale case and having a transversely extending support arm, a feeder drive chain carried on said bale case and extending parallel to the reciprocations of said plunger, said support arm having an opening and said chain freely extending therethrough, and means connecting said chain to said support arm whereby the chain is normally reciprocated with the plunger, said connecting means being detachable when overloaded to separate the chain from the plunger and comprising a connector block having an opening through which the chain extends, a pair of shear bolts on opposite sides respectively of the chain and fastening said connector block to said support arm, said bolts extending parallel to the reciprocation of the plunger and to the extension of the chain, a pin on said chain between said bolts and extending transverse thereto, said connector block being pivotally carried on said pin whereby if one of said bolts breaks before the other the connector block pivots about said pin and the chain is protected against bending strains.

2. In a hay baler as recited in claim 1 wherein said chain has a link element normally within said connector block and transversely bored to receive said pin.

3. In a hay baler as recited in claim 1 wherein said pin has opposite ends projecting through opposite side legs of said connector block.

4. In a hay baler, a bale case, a plunger reciprocable in said bale case and having a transversely extending support arm, a feeder drive chain carried on said bale case and extending parallel to the reciprocations of said plunger, said support arm having an opening and said chain freely extending therethrough, a connector block, a pair of shear bolts on opposite sides respectively of the chain and fastening said block to said support arm, and a pivotal connection between said chain and block and transverse to the chain extension whereby if one of said bolts breaks before the other the block is free to pivot relative to said chain.

References Cited in the file of this patent

UNITED STATES PATENTS

| | | |
|---|---|---|
| 2,757,602 | Nolt | Aug. 7, 1956 |
| 2,948,101 | Long | Aug. 9, 1960 |

FOREIGN PATENTS

| | | |
|---|---|---|
| 229,789 | Australia | Aug. 9, 1960 |